(12) United States Patent
McLaughlin et al.

(10) Patent No.: US 8,555,381 B2
(45) Date of Patent: Oct. 8, 2013

(54) CLOUD COMPUTING AS A SECURITY LAYER

(75) Inventors: Paul F. McLaughlin, Ambler, PA (US); Kevin P. Staggs, Peoria, AZ (US)

(73) Assignee: Honeywell International Inc., Morristown, NJ (US)

( * ) Notice: Subject to any disclaimer, the term of this patent is extended or adjusted under 35 U.S.C. 154(b) by 684 days.

(21) Appl. No.: 12/416,811

(22) Filed: Apr. 1, 2009

(65) Prior Publication Data

US 2010/0257605 A1    Oct. 7, 2010

(51) Int. Cl.
  *G06F 7/04* (2006.01)
  *G06F 9/00* (2006.01)
  *G06F 11/00* (2006.01)
  *H04L 29/06* (2006.01)

(52) U.S. Cl.
  USPC ........ 726/22; 726/3; 726/13; 726/23; 726/25; 713/154

(58) Field of Classification Search
  USPC .................. 726/23, 3, 13, 22, 25; 713/154
  See application file for complete search history.

(56) References Cited

U.S. PATENT DOCUMENTS

| | | | |
|---|---|---|---|
| 5,657,390 A | 8/1997 | Elgamal et al. | |
| 6,480,896 B1 | 11/2002 | Brown et al. | |
| 6,816,973 B1 | 11/2004 | Gleichauf et al. | |
| 7,130,891 B2 | 10/2006 | Bernardin et al. | |
| 7,151,966 B1 | 12/2006 | Baier et al. | |
| 7,206,286 B2 * | 4/2007 | Abraham et al. | 370/235 |
| 7,461,403 B1 | 12/2008 | Libenzi et al. | |
| 7,548,977 B2 | 6/2009 | Agapi et al. | |
| 7,584,274 B2 | 9/2009 | Bond et al. | |
| 7,620,986 B1 | 11/2009 | Jagannathan et al. | |
| 7,636,764 B1 | 12/2009 | Fein et al. | |
| 7,684,876 B2 | 3/2010 | Grgic | |
| 7,886,065 B1 * | 2/2011 | Satish et al. | 709/229 |
| 7,957,335 B2 * | 6/2011 | Durazzo et al. | 370/318 |
| 2003/0014498 A1 | 1/2003 | Kreidler et al. | |
| 2003/0061212 A1 | 3/2003 | Smith et al. | |
| 2003/0120778 A1 | 6/2003 | Chaboud et al. | |
| 2004/0002943 A1 | 1/2004 | Merrill et al. | |
| 2004/0128539 A1 | 7/2004 | Shureih | |
| 2004/0260769 A1 | 12/2004 | Yamamoto | |
| 2005/0021594 A1 | 1/2005 | Bernardin et al. | |
| 2005/0021705 A1 | 1/2005 | Jurisch | |

(Continued)

FOREIGN PATENT DOCUMENTS

| | | |
|---|---|---|
| DE | 102004030781 A1 | 3/2006 |
| WO | WO 2005/020179 A1 | 3/2005 |
| WO | WO 2009/046095 A1 | 4/2009 |

OTHER PUBLICATIONS

Aaron Skonnard, "Why Service Virtualization Matters", Microsoft Services, 4 pages.

(Continued)

*Primary Examiner* — Mohammad W Reza

(57) ABSTRACT

A system includes a computing cloud comprising at least one data storage unit and at least one processing unit. The computing cloud is configured to connect to at least one client and monitor the traffic of the at least one client. The computing cloud is further configured to determine an operational mode of the client, compare the monitored traffic with an anticipated traffic pattern associated with the operational mode, and determine if a security threat is indicated based on the comparison.

22 Claims, 8 Drawing Sheets

(56) References Cited

U.S. PATENT DOCUMENTS

| | | | |
|---|---|---|---|
| 2005/0076245 A1* | 4/2005 | Graham et al. | 713/201 |
| 2005/0195840 A1* | 9/2005 | Krapp et al. | 370/401 |
| 2005/0276228 A1 | 12/2005 | Yavatkar et al. | |
| 2005/0278441 A1 | 12/2005 | Bond et al. | |
| 2006/0004786 A1 | 1/2006 | Chen et al. | |
| 2006/0059163 A1 | 3/2006 | Frattura et al. | |
| 2006/0155633 A1 | 7/2006 | Fellenstein et al. | |
| 2006/0184626 A1 | 8/2006 | Agapi et al. | |
| 2006/0230149 A1 | 10/2006 | Jackson | |
| 2007/0055702 A1 | 3/2007 | Fridella et al. | |
| 2007/0074288 A1* | 3/2007 | Chang et al. | 726/22 |
| 2007/0157286 A1* | 7/2007 | Singh et al. | 726/1 |
| 2008/0120414 A1 | 5/2008 | Kushalnagar et al. | |
| 2008/0159289 A1 | 7/2008 | Narayanan et al. | |
| 2008/0163370 A1* | 7/2008 | Maynard | 726/22 |
| 2008/0270523 A1 | 10/2008 | Parmar et al. | |
| 2008/0295173 A1* | 11/2008 | Tsvetanov | 726/23 |
| 2009/0125370 A1 | 5/2009 | Blondeau et al. | |
| 2009/0178108 A1* | 7/2009 | Hudis et al. | 726/1 |
| 2009/0210071 A1 | 8/2009 | Agrusa et al. | |
| 2009/0271012 A1 | 10/2009 | Kopka et al. | |
| 2009/0300151 A1 | 12/2009 | Friedman et al. | |
| 2009/0300210 A1 | 12/2009 | Ferris | |
| 2009/0300635 A1 | 12/2009 | Ferris | |
| 2010/0022231 A1 | 1/2010 | Heins et al. | |
| 2010/0042720 A1 | 2/2010 | Stienhans et al. | |
| 2010/0256794 A1 | 10/2010 | McLaughlin et al. | |
| 2010/0256795 A1 | 10/2010 | McLaughlin et al. | |
| 2010/0257227 A1 | 10/2010 | McLaughlin et al. | |
| 2010/0257228 A1 | 10/2010 | Staggs et al. | |
| 2011/0214157 A1* | 9/2011 | Korsunsky et al. | 726/1 |

OTHER PUBLICATIONS

Notification of Transmittal of the International Search Report and the Written Opinion of the International Searching Authority, or the Declaration dated Oct. 29, 2010 in connection with International Patent Application No. PCT/US2010/028218.

Notification of Transmittal of the International Search Report and the Written Opinion of the International Searching Authority, or the Declaration dated Oct. 29, 2010 in connection with International Patent Application No. PCT/U52010/028210.

Notification of Transmittal of the International Search Report and the Written Opinion of the International Searching Authority, or the Declaration dated Oct. 29, 2010 in connection with International Patent Application No. PCT/US2010/028208.

"Real-Time Data Hosting . . . ", www.industrialevolution.com/ms_services_host.html, 1 page.

"Real-Time Date Hosting . . . ", www.industrialevolution.com/ms_services_host.html, 1 page.

Zheng Wang, et al., "Prefetching in World Wide Web", IEEE Global Telecommunications Conference, Nov. 1996, p. 28-32.

Supplementary European Search Report dated Nov. 19, 2012 in connection with European Patent Application No. EP 10 76 4813.

Communication pursuant to Article 94(3) EPC dated Mar. 15, 2013 in connection with European Patent Application No. 10 764 816.4.

Supplementary European Search Report dated Mar. 4, 2013 in connection with European Patent Application No. EP 10 76 4816.

* cited by examiner

| State | Traffic Condition Expected | Traffic Condition Observed | Intru? |
|---|---|---|---|
| Startup (602) | 4 | 4 | N |
| Shutdown (604) | 2 | 2 | N |
| Maintenance (606) | 3 | 5 | Y |
| Normal Operation (608) | 1 | 5 | Y |
| Installation (610) | 4 | 4 | N |

CLOUD COMPUTING AS A SECURITY LAYER

TECHNICAL FIELD

This disclosure relates generally to computer systems and, more specifically, to the use of cloud computing in security applications, and systems and methods related to the use of cloud computing in security applications.

BACKGROUND

Cloud computing is an emerging technology in the information technology (IT) industry. Cloud computing allows for the moving of applications, services and data from desktop computers back to a main server farm. The server farm may be off premises and be implemented as a service. By relocating the execution of applications, deployment of services, and storage of data, cloud computing offers a systematic way to manage costs of open systems, centralize information, and enhance robustness and reduce energy costs.

SUMMARY

This disclosure provides a system and method for using cloud computing in security applications.

In a first embodiment, the system includes a computing cloud comprising at least one data storage unit and at least one processing unit. The computing cloud is configured to connect to at least one client and monitor traffic of the at least one client. The computing cloud is further configured to determine an operation mode of the client, compare the monitored traffic with an anticipated traffic pattern associated with the operational mode, and determine if a security threat is indicated based on the comparison.

In particular embodiments, the security threat is an attack on the client through a denial of service (DOS) attack. In yet other particular embodiments, the security threat is an unauthorized attack on the client. In further embodiments, the computing cloud is configured to report a security threat to the client.

In still other particular embodiments, the operational mode is selected from a list of known operational modes, and each operational mode comprises one or more characteristics regarding the anticipated traffic pattern associated with that operational mode.

In yet further embodiments, the computing cloud is configured to filter data that reaches the client. In still yet further embodiments, the filtering of data by the computing cloud comprises preventing spam and malware from reaching the client. In still yet other embodiments, the filtering of data by the computing cloud comprises preventing unauthorized access to the client.

In a second embodiment, a method includes defining a plurality of operational modes. Each operational mode is associated with at least one anticipated traffic pattern of a client. The method further includes storing the plurality of operational modes, monitoring traffic of the client, determining the operational mode of the client, and comparing the monitored traffic of the client with the anticipated traffic pattern associated with the operational mode of the client.

In a third embodiment, a system includes a computing cloud comprising at least one processing unit and at least one data storage unit. The system also includes a client connected to a network through the computing cloud. The computing cloud is configured to monitor network traffic of the client to maintain security of the client.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 8, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
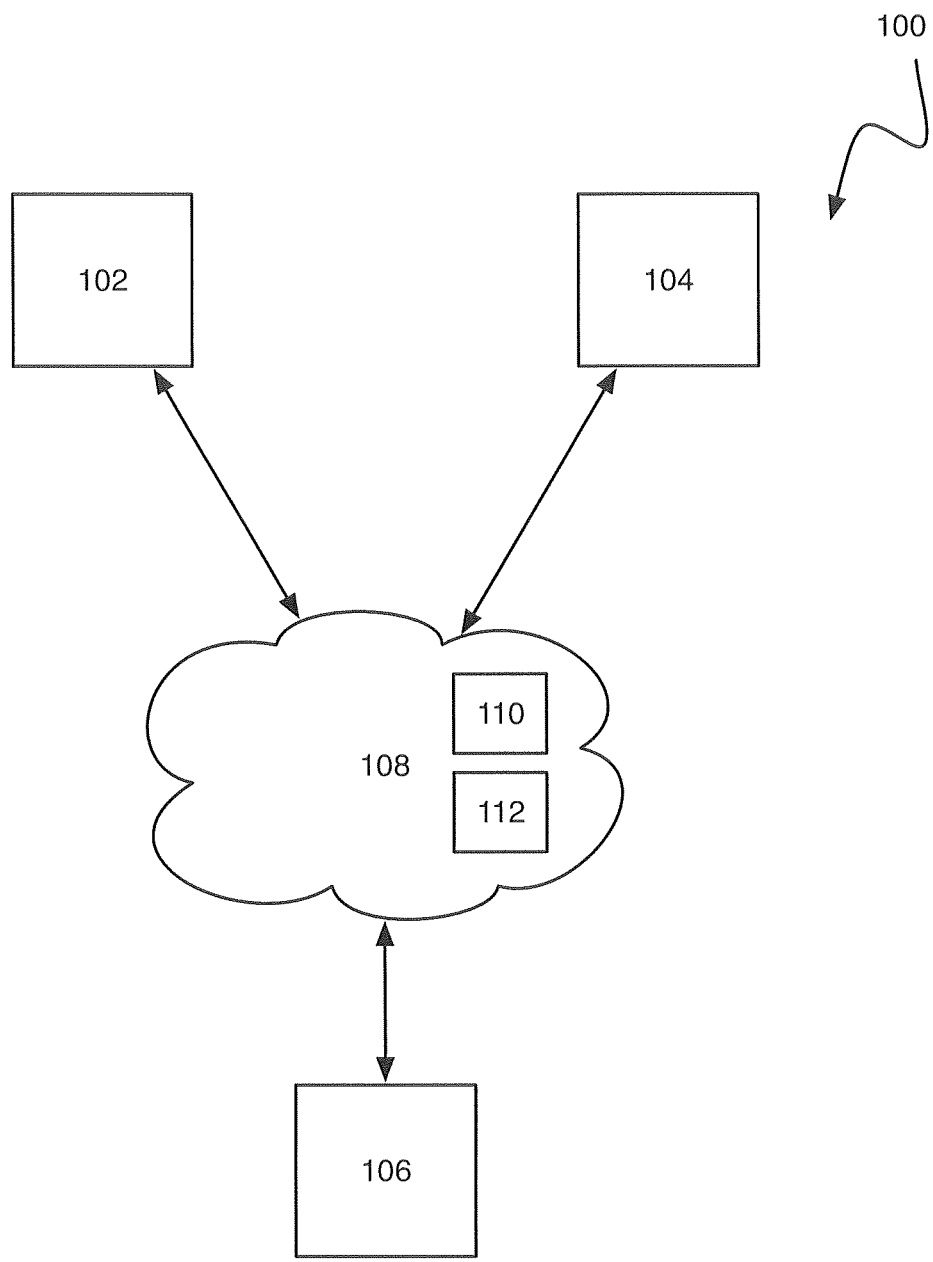
FIG. 1 illustrates an example cloud computing environment according to this disclosure.

FIG. 1 illustrates an example system 100 according to this disclosure. FIG. 1 shows clients 102, 104, and 106 connected to a computing cloud 108. Computing cloud 108 comprises processing unit 110 and data storage unit 112, both of which are accessible to clients 102, 104, and 106. One of the innovative aspects of this disclosure is the ability to design a flexible, robust cloud 108 that can service a variety of deployment environments through an innovative hybrid approach. This hybrid approach recognizes both the type of information needed as well as the location of where that information needs to be. For instance in a manufacturing execution system (MES) used in an automated factory setting, the system must recognize both the types of information needed to be processed as well as which information needs to be stored locally and which information may be stored in a computing cloud.

Computing cloud 108 is a computing cloud that is capable of both storing information and performing data functions on information. A computing cloud comprises at least one computer that is accessible from a remote location. The computing cloud 108 may comprise a plurality of storage devices that will be referred to as collectively the storage unit 112, as well as a plurality of processing units that will be referred to collectively as the processing unit 110. The computing cloud 108 may comprise hardware that is cost prohibitive to deploy and maintain at individual clients 102, 104, and 106. In addition, the computing cloud 108 may comprise software that is cost prohibitive to install, deploy, and maintain at individual computing clouds. Therefore, the computing cloud 108 may provide this hardware and software through secure connections to clients 102, 104, and 106. While there is one computing cloud 108 shown in FIG. 1, it is explicitly understood that a plurality of clouds may be consistent with this disclosure.

Clients 102, 104, and 106 are individual computers, plant sites, or operational locations that are in communication with the computing cloud 108. Clients 102, 104, and 106 are capable of accessing both the processing unit 110 and storage unit 112 that are located in the computing cloud 108. Clients 102, 104, and 106 are able to access both local processes as well as information from the computing cloud 108. Clients 102, 104, and 106 may comprise a plurality of manufacturing tools and sensors to monitor the manufacturing tools. These sensors may detect any operational condition of the manufacturing tools, including, but not limited to, the temperature, vibration, or other measureable operating parameter.

Clients 102, 104, and 106 communicate with the computing cloud 108 through any secured or unsecured method, including Hypertext Transfer Protocol Secure (HTTPS), secure telnet, or file transfer protocol secure (FTPS). It is understood that secure methods may be preferred over unsecure methods, and that the particular method chosen will depend upon the requirements of the function being accessed. This disclosure should not be interpreted as being limited to any particular protocol or method of transferring data.

It us understood that the communication between the clients 102-106 and the computing cloud 108 may be unidirectional or bidirectional. In many of the systems and methods disclosed herein, bidirectional communication is preferred. The phrase "unidirectional communication" refers to communication in which data is sent from one communications device to a second communications device. The term "bidirectional communication" refers to communication where data is sent and received by two or more communication devices.

In some embodiments, the computing cloud 108 may leverage a Service Oriented Architecture (SOA) to abstract consumers of cloud services from the location services themselves. When a cloud user at a given client invokes a function, such as an MES function, that function could be performed by MES components local to the same client or redirected to MES components running on a server in the computing cloud 108. This redirection is performed by a service bus that exposes a set of service endpoints to users who interact with these services as if the services were local. The service bus directs requests for those services to the appropriate service providers either locally or in the cloud based on configured mapping. Mapping can be done on a per service basis, allowing a mix of local and cloud-based services to be used. The service bus itself could be local to the plant or also located in the cloud. The disclosed systems and methods can be designed for multi-tenancy, such that many companies can share the same physical database resources but keep their data respective entirely private.

One of the innovative features of this disclosure is the use of a hybrid approach when distributing data storage and data processing among a plurality of clouds in use by a manufacturing execution system. Some features of the clients 102, 104, and 106 can be better performed by the computing cloud 108 than at the client 102, 104, and 106. By determining which functions can be performed more efficiently in the computing cloud 108 than at the local client 102, 104, and 106, computing resources can be allocated in such a way as to maximize performance.

Figure 2:
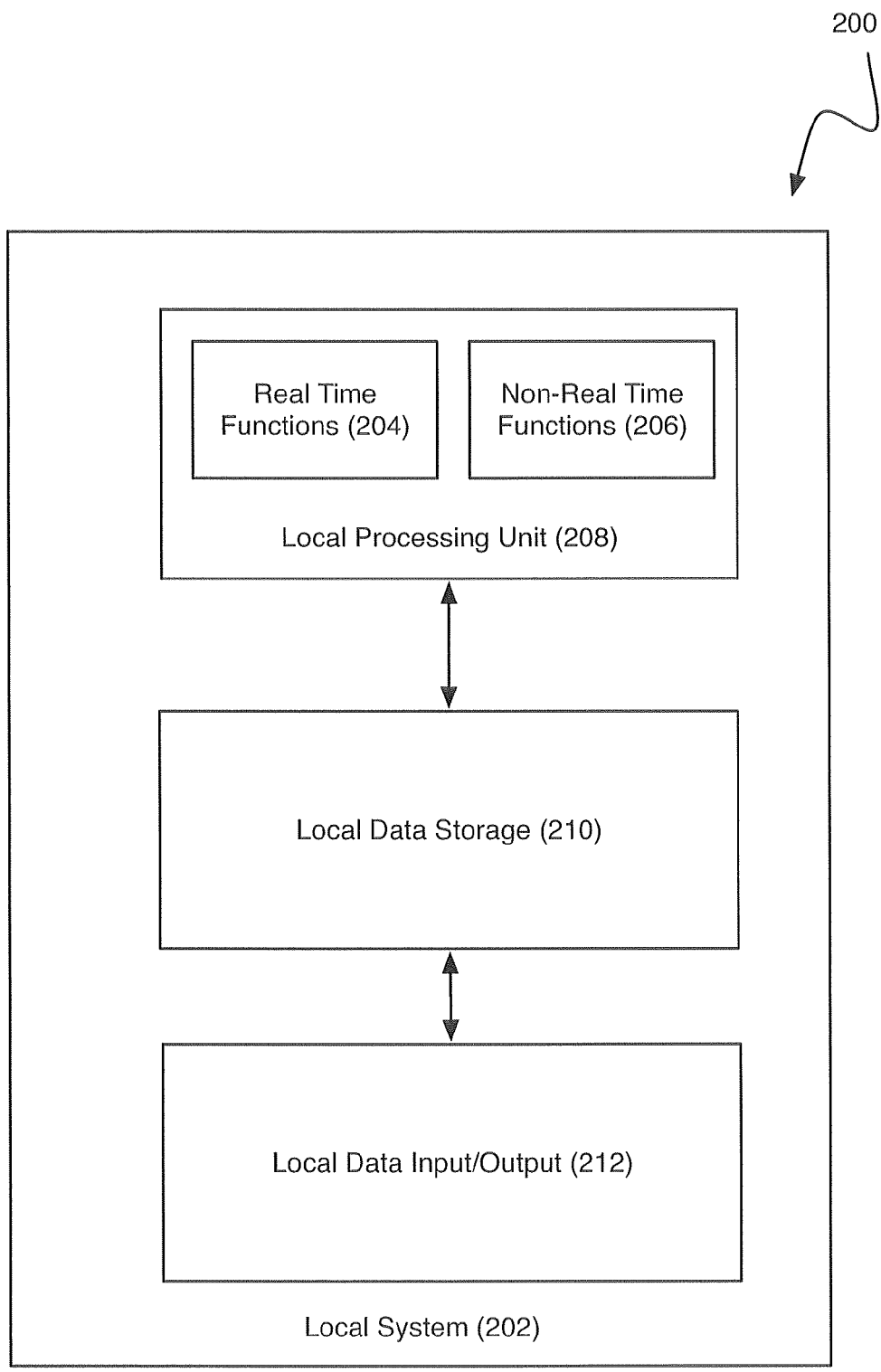
FIG. 2 illustrates an example local system environment according to this disclosure.

FIG. 2 is an illustration 200 of a local system 202. Each client 102, 104, and 106 comprises a local system 202. The local system 202 comprises a local processing unit 208, a local data storage 210, and a local data input/output 212. The local processing unit 208 may comprise both real time functions 204 and non-real-time functions 206.

Real time functions are those functions that instruct or control other devices, including the actual mechanical systems used in a factory. These real time functions are generally always required to be available, and may be designed to be non-resource intensive. An example of these real time functions may include the programming of a basic automated system to perform a specific function (e.g., drill into a substance) for a specific time.

Non-real time functions are functions that may be used to form the real-time functions. Examples of non-real-time functions are those functions used to train the real time functions and simulations of the products created by the non-real-time functions. These non-real-time functions are may be processor intensive and require specialized software.

Not only may functions be performed on a real time or non-real time basis, data may be required by the system on a real or non-real time basis. In one embodiment, data that is required on a real time basis will be stored locally in local data storage 210 while data that is not needed on a real time basis may be stored in the storage unit 112 in the computing cloud 108.

One of the problems with the conventional deployment of MES systems is that the most accurate simulation models were too expensive to deploy into the local systems. In addition, the most accurate simulation models had storage requirements that exceeded the available storage of the local data storage 210. This disclosure overcomes these problems through a process of both data and process segregation. By determining whether a specific process or data is required to be performed in real time or in non-real time, those functions that can be delayed may be placed into the computing cloud 108.

The delineation between real time and non-real time is intended to be an exemplary method of determining which processes and data should be stored locally and which processes and data should be stored in the computing cloud 108. It is expressly understood that other delineations may be used, based on priority or other characteristics of the data. Any system or method that delineates shared processes and storage, and then executes the system and method using a hybrid approach on both a computing cloud 108 and a local system 202 is explicitly contemplated by this disclosure.

Another example of a delineation that may be used to determine which data and which functions are to be placed into the computing cloud 108 is based upon whether the data and functions are "high level" or "low level". A high level function may include a function that is not directly tied to the actual operation of a piece of machinery. Examples of high level functions may include scheduling, reconciliation, or other functions that may be executed in the computing cloud 108.

One of the advantages to the disclosed hybrid approach is the enhancement of manufacturing execution systems (MES). Manufacturing execution systems are used to provide instructions or routines to basic automated systems. Basic automated systems in turn are used to instruct systems directly on what actions to perform (e.g., the actual operation of automation hardware).

Another advantage of the presently disclosed systems and methods is the ability to rapidly deploy new services or features to a plurality of clients without the need to make changes to the clients themselves. As a new service becomes available (e.g., simulation becomes available), this service may be offered to improve the manufacturing process at a given site without the need for reprogramming at the site.

Yet another advantage of the presently disclosed systems and methods is the ability for enhanced data collection and analysis. Through the linking of the clients 102, 104, and 106 to the computing cloud 108, data may be uploaded to the cloud 108 by the clients 102, 104, and 106 that represents real time information related to the data processes. This information may, in turn, be used by the computing cloud 108 for a number of functions, including monitoring the production results and identifying potential problems with equipment. For instance, the cloud may, in some embodiments, apply a model, such as a heuristic model, to identify potential compromises in network security. These compromises to network security include both attacks that originate from outside of the network as well as breaches to network security that originate from within the network.

Figure 3:
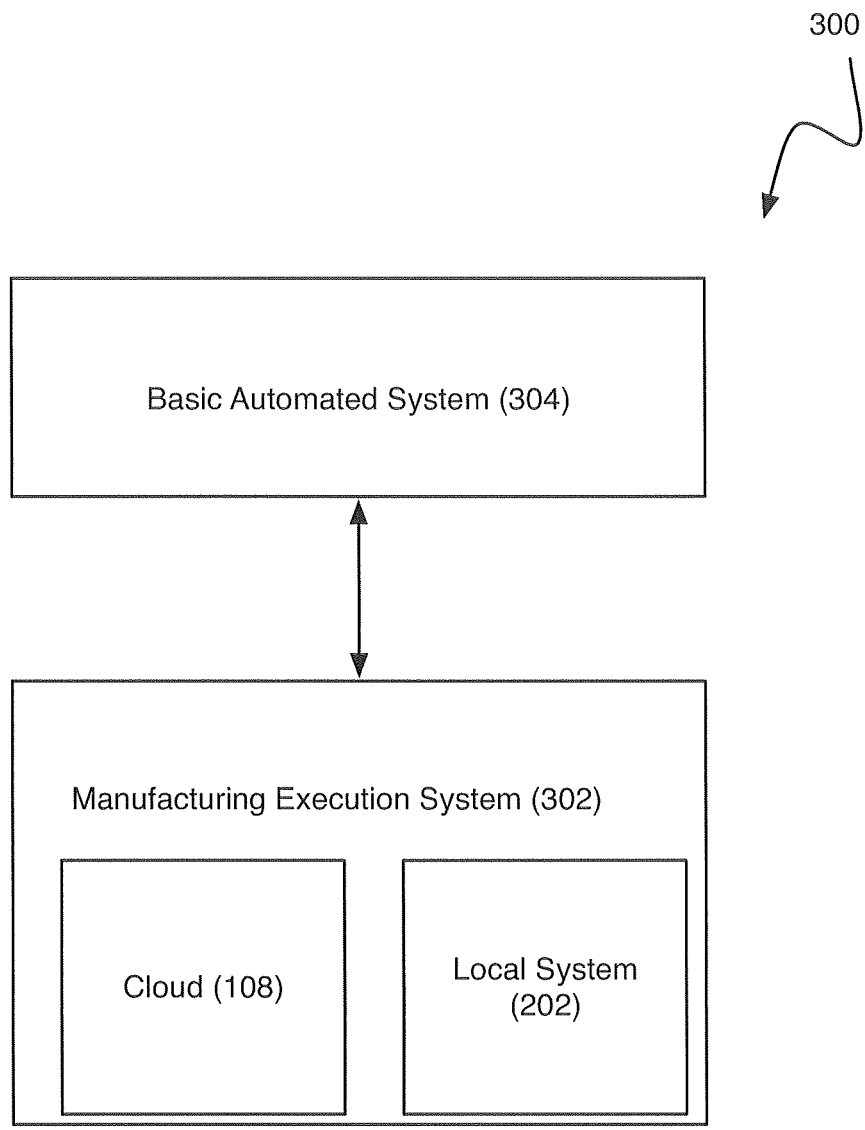
FIG. 3 illustrates an example manufacturing system according to this disclosure.

FIG. 3 is an example embodiment 300 of one system using a manufacturing execution system 302. In this example embodiment, the manufacturing execution system 302 comprises both the computing cloud 108 and the local system 202. The manufacturing execution system 302 is used to control the basic automated system 304. It is understood that the manufacturing execution system may comprise a plurality of local systems and a plurality of computing clouds.

Figure 4:
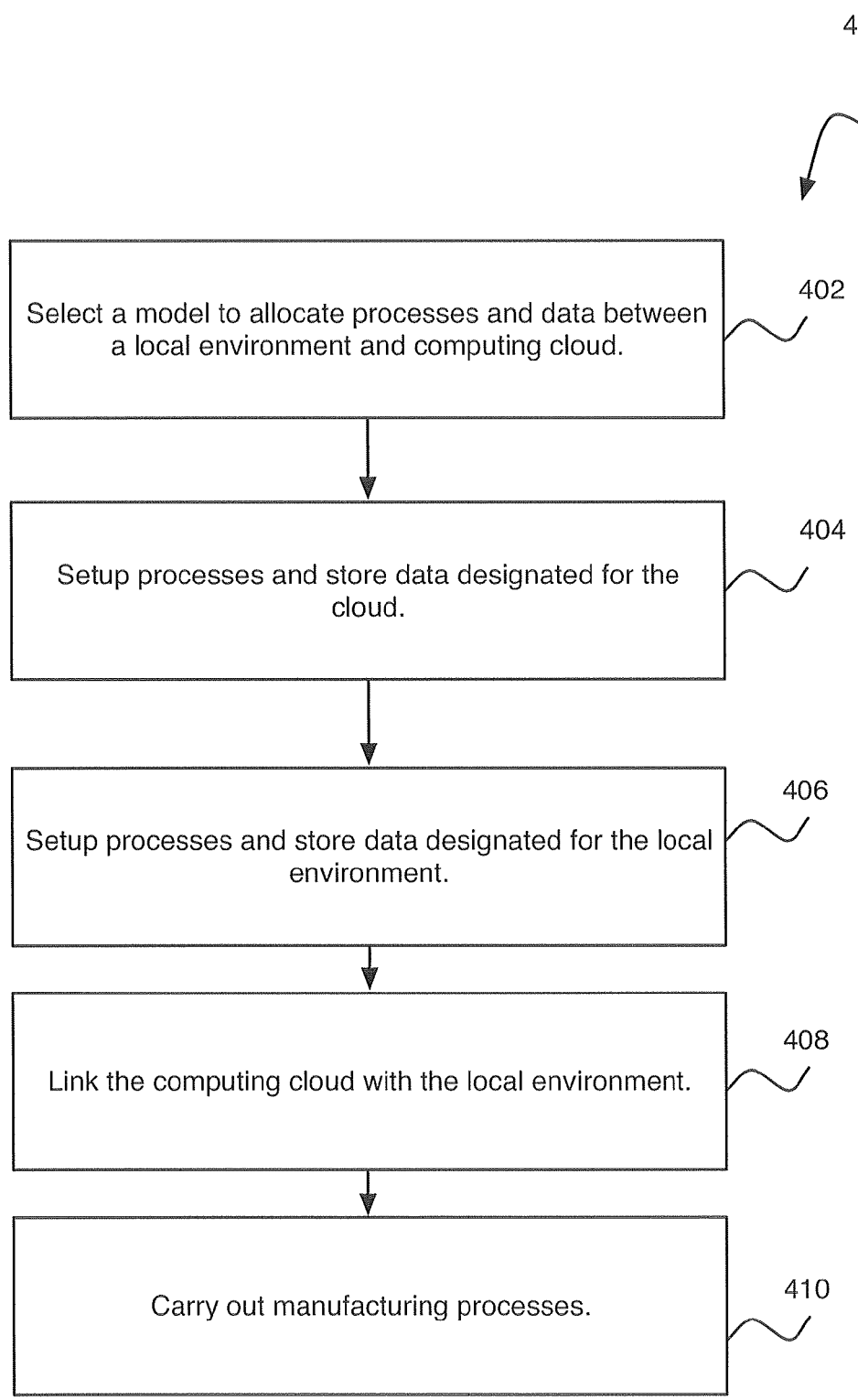
FIG. 4 illustrates an example method of allocating processes and data according to this disclosure.

FIG. 4 is an example of one method 400 of executing the presently disclosed hybrid approach. In this embodiment, a model is selected to allocate processes and data between the local environment 202 and the computing cloud 108 in block 402. In block 404, the processes for the cloud are setup, and data is stored in the cloud. In block 406, the processes for the local environment are setup, and data is stored in the local environment. In block 408, the computing cloud 108 is linked to the local environment 202. In block 410, the manufacturing processes are carried out.

Figure 5:
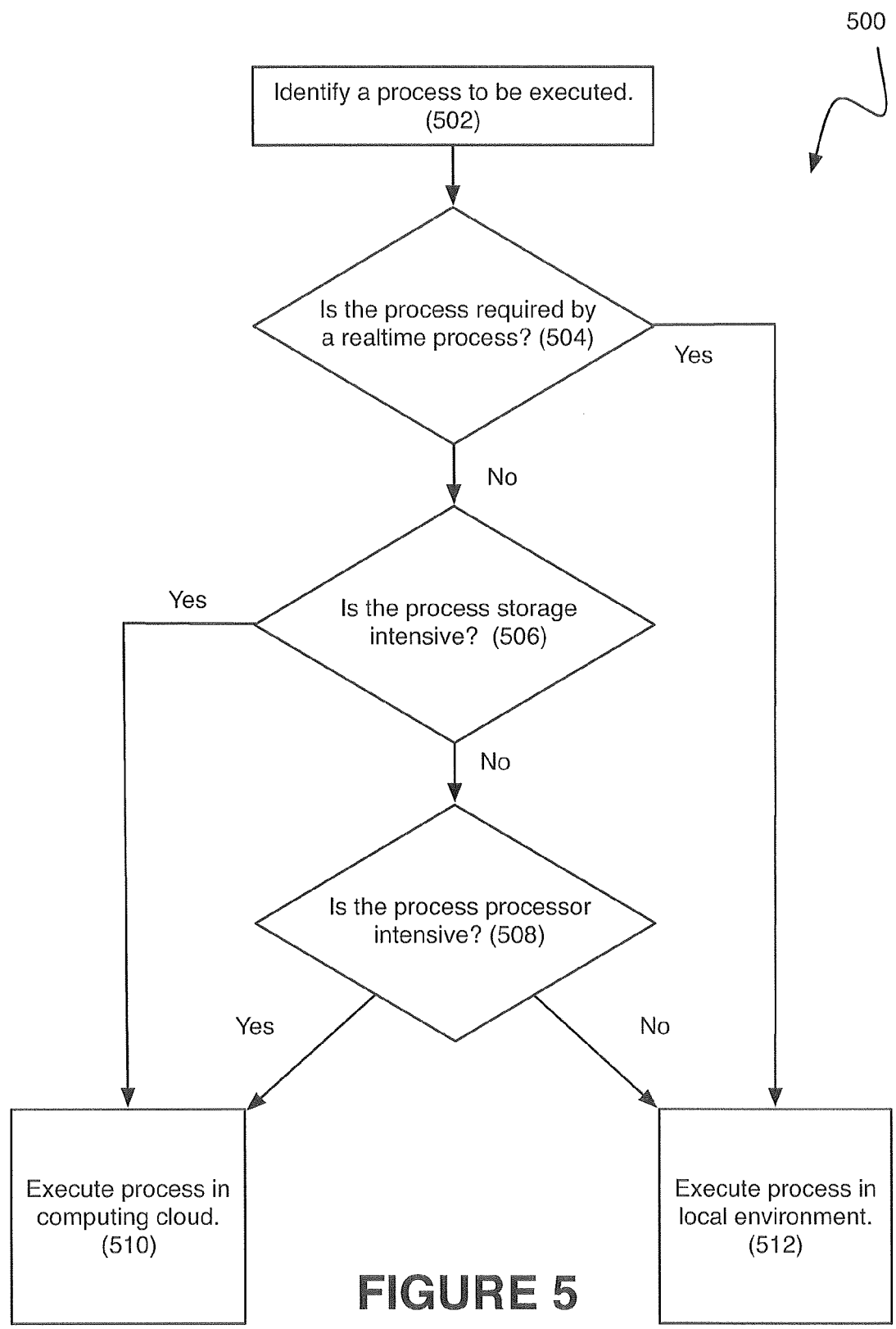
FIG. 5 illustrates another example method of allocating processes and data according to this disclosure.

FIG. 5 is a flowchart 500 illustrating one method of determining if a particular process is going to be executed in the local environment 202 or in the computing cloud 108 using the aforementioned delineation between real-time and non-real-time description. In this flowchart 500, a process to be executed is identified in block 502. In block 504, a determination is made as to whether the process is required by a real-time process. If the process is required by a real-time process, it will be executed in the local environment 202 in block 512. If the process is not required by a real-time process, a determination is made in block 506 as to whether the process is storage intensive in block 506. If the process is storage intensive, the process will be executed in the computing cloud 108 in block 510. If the process is not storage intensive, a determination is made in block 508 as to whether the process is processor intensive. If the process is processor intensive, the process is executed in the computing cloud 108 in block 510, otherwise the process is executed in the local environment 202 in block 512. It is expressly understood that a similar method may be applied to determine if data storage should be stored in the local environment or in the computing cloud 108.

Industrial system security requires ever more vigilant capabilities in the automation system against attacks. Some example types of attacks include denial of service (DOS) attacks, man-in-the-middle attacks, virus protection, unwanted email (such as SPAM), and infiltration by hackers. These attacks may lead to a client being compromised by another computer system. Another benefit of the present hybrid approach is the ability to create an intrusion detection mechanism based upon the presence or absence of abnormal traffic patterns detected by the computing cloud 108 in the state of operation of the local environment 202.

One problem with conventional data and intrusion detection systems is the number of false positives that are detected. These false positives are often the result of a change in the state of operation of a local environment 202. Through the disclosed hybrid approach, the computing cloud 108 may be configured to make a determination of the expected traffic condition for a particular state and then compare the expected traffic condition with the actual traffic condition. This hybrid approach therefore allows for both the detection of intrusions as well as the prevention of compromises in security.

Figure 6:
FIG. 6 illustrates an example table of traffic conditions according to this disclosure.

FIG. 6 illustrates an example table 600 of traffic conditions according to this disclosure. Integer numbers are given for the traffic conditions, and these are intended to be representative of a number of factors, including the amount of bandwidth currently used, the number of destination internet protocol addresses, and the type of data being transmitted (such as the port over which data is being transmitted). This embodiment of the table 600 is for illustration only. In this specific implementation, traffic condition 1 refers to low data traffic to any location. Traffic condition 2 refers to low data transfer except over an FTPS connection. Traffic condition 3 refers to low data transfer except over a FTPS and a logging port connection. Traffic condition 4 refers to high data transfer in-between the cloud and the local environment. Traffic condition 5 refers to high data transfers. Any other or additional traffic condition types could be supported, such as email traffic, file transfer protocol traffic, and hypertext transfer protocol traffic.

In the table 600 shown in FIG. 6, a number of states are shown, including a startup state 602, a shutdown state 604, a maintenance state 606, a normal operation state 608, and an installation state 610. In each of these states, an expected traffic condition and an observed traffic condition are shown. If the expected traffic condition is not equal to the observed traffic condition, there is a probable intrusion. The examples shown in FIG. 6 are intended to be examples only.

The integers shown in FIG. 6 may be created based upon a weighted profile system made possible through the computing cloud 108. For instance, during startup 602, a large amount of process alarm traffic may be expected. The computing cloud 108 monitoring the data transfer by a local environment 202 is able, through intelligent modeling, to determine if the traffic being sent is consistent with the traffic that should be present during the startup. In this way, the computing cloud 108 can minimize the false positives that may otherwise be present. In addition, the computing cloud 108 is able to determine what traffic is coming from an intruder and filter the traffic that is being initiated by the intruder. The computing cloud 108 may use any type of algorithm to create a profile of expected data traffic, such as those based on empirical models or observations of actual data transfers.

In addition to monitoring, this approach may further include filtering certain incoming and outgoing traffic (such as all Internet activity) and checking for improper, malicious and illegal activity, as well as blocking all but appropriate and authorized access. The ability to prescreen security access at the cloud level offers yet another layer of security onto the disclosed systems.

Figure 7:
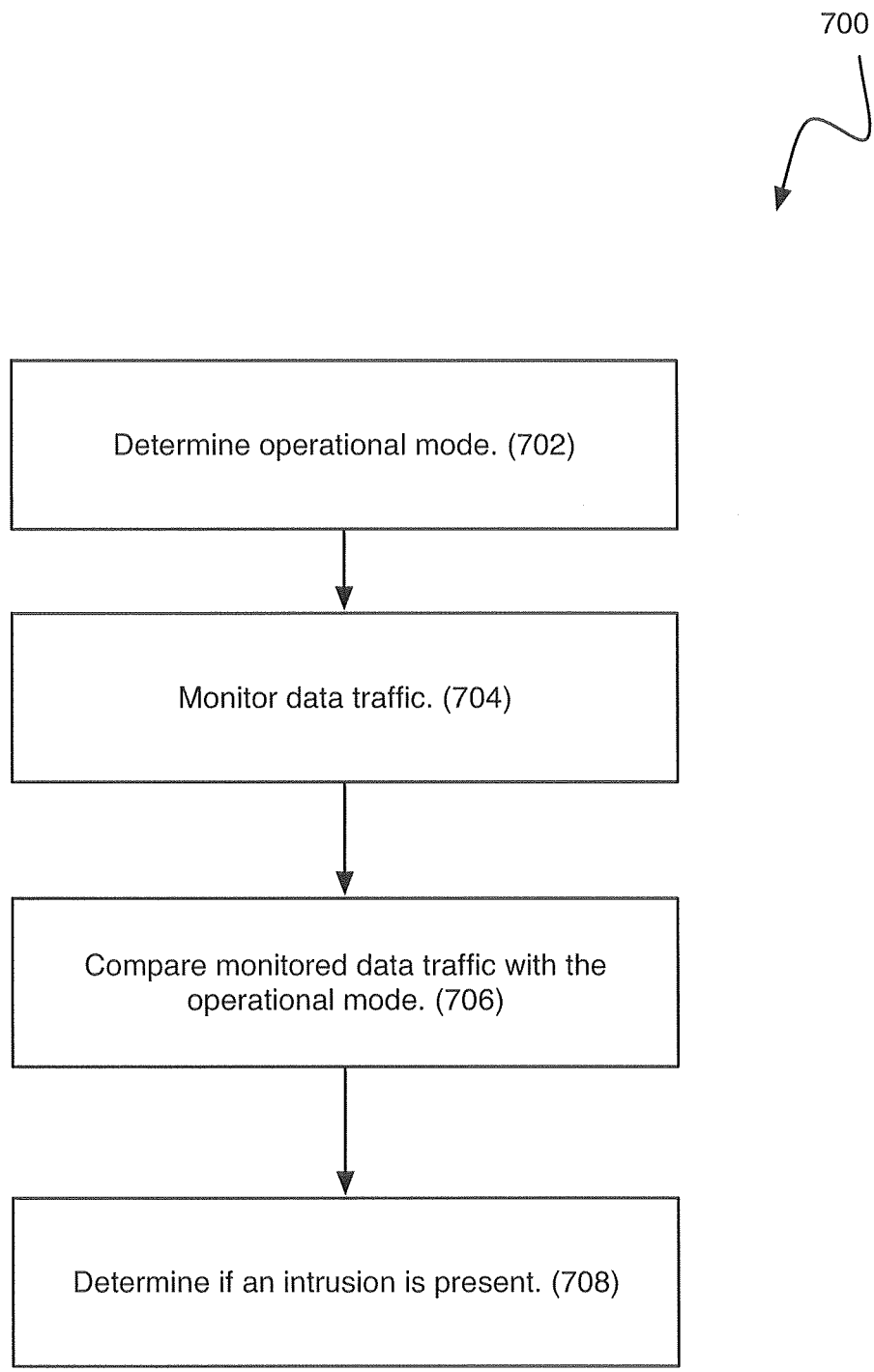
FIG. 7 illustrates an example method of detecting intrusions according to this disclosure.

FIG. 7 illustrates an example method 700 of detecting intrusions according to this disclosure. In block 702, an operational mode is determined. In block 704, data traffic is monitored. In block 706, the monitored traffic is compared with the traffic expected for the operational mode. In block 708, a determination is made as to whether an intrusion is present.

Figure 8:
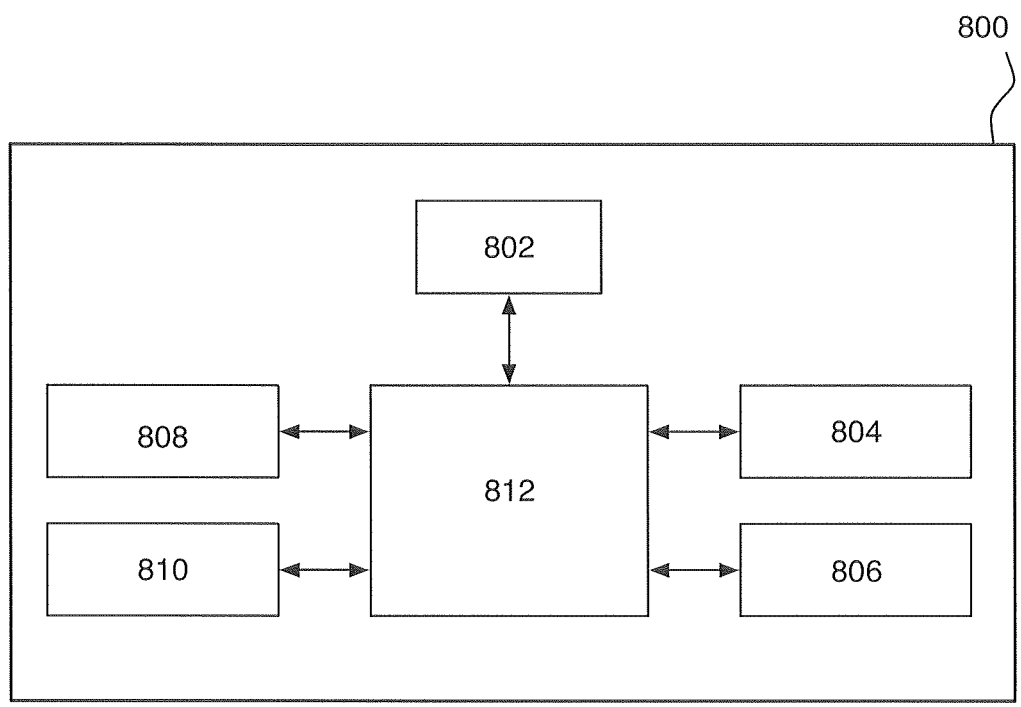
FIG. 8 illustrates an example computer system supporting cloud computing according to this disclosure.

Computing cloud 108 and elements of the local environment 202 described above may be implemented on any general-purpose computer 800 with sufficient processing power, memory resources, and network throughput capability to handle the necessary workload placed upon it. A consumer home personal computer, networked to computing cloud 108 through a wide area network, such as the Internet, may be used in conjunction with the disclosed embodiments. The consumer home personal computer may share some, or all, of the elements of computing cloud 108. FIG. 8 illustrates a typical computer system suitable for implementing one or more embodiments disclosed herein. The general-purpose computer 800 includes a processor 812 (which may be referred to as a central processor unit or CPU) that is in communication with memory devices including secondary storage 802, read only memory (ROM) 804, random access memory (RAM) 806, input/output (I/O) 808 devices, and network connectivity devices 810. The processor may be implemented as one or more CPU chips.

The secondary storage 802 is typically comprised of one or more disk drives or tape drives and is used for non-volatile storage of data and as an over-flow data storage device if RAM 806 is not large enough to hold all working data. Secondary storage 802 may be used to store programs that are loaded into RAM 806 when such programs are selected for execution. The ROM 804 is used to store instructions and perhaps data that are read during program execution. RON 804 is a non-volatile memory device that typically has a small memory capacity relative to the larger memory capacity of secondary storage. The RAM 806 is used to store volatile data and perhaps to store instructions. Access to both ROM 804 and RAM 806 is typically faster than to secondary storage 802.

I/O 808 devices may include printers, video monitors, liquid crystal displays (LCDs), touch screen displays, keyboards, keypads, switches, dials, mice, track balls, voice recognizers, card readers, paper tape readers, or other well-known input devices. The network connectivity devices 810 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity devices 810 may enable the processor 812 to communicate with an Internet or one or more intranets. With such a network connection, it is contemplated that the processor 812 might receive information from the network, or might output information to the network in the course of performing the above-described method steps. Such information, which is often represented as a sequence of instructions to be executed using processor 812, may be received from and outputted to the network, for example, in the form of a computer data signal embodied in a carrier wave.

Such information, which may include data or instructions to be executed using processor 812 for example, may be received from and outputted to the network, for example, in the form of a computer data baseband signal or signal embodied in a carrier wave. The baseband signal or signal embodied in the carrier wave generated by the network connectivity devices 810 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embodied in the carrier wave, or other types of signals currently used or hereafter developed, referred to herein as the transmission medium, may be generated according to several methods well known to one skilled in the art.

The processor 812 executes instructions, codes, computer programs, scripts that it accesses from hard disk, floppy disk, optical disk (these various disk based systems may all be considered secondary storage 802), ROM 804, RAM 806, or the network connectivity devices 810.

While shown as a series of steps, various steps in FIGS. 4 and 5 could overlap, occur in parallel, occur in a different order, or occur multiple times. Further, note that these steps could occur at any suitable time, such as in response to a command from a user or external device or system.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A system comprising:
a computing cloud comprising at least one data storage unit and at least one processing unit;
wherein the computing cloud is configured to connect to a client, monitor traffic associated with the client, determine an operational mode of the client, generate a value for a condition of the monitored traffic, compare the generated value for the condition of the monitored traffic with a value for an anticipated traffic pattern associated with the operational mode to form a comparison, and determine if a security threat is indicated based on the comparison;

wherein, to generate the value for the condition of the monitored traffic, the computing cloud is configured to generate the value for the condition of the monitored traffic based on a number of factors including a number of destination Internet Protocol addresses for the traffic associated with the client, an amount of network bandwidth used at the client, and ports over which the traffic associated with the client is being transmitted.

2. The system of claim 1, wherein the security threat comprises a denial of service (DOS) attack.

3. The system of claim 1, wherein the security threat comprises a man-in-the-middle attack.

4. The system of claim 1, wherein the operational mode is selected from a list of known operational modes, and wherein each operational mode in the list of known operational modes is associated with one or more characteristics regarding the anticipated traffic pattern associated with that operational mode.

5. The system of claim 1, wherein the computing cloud is configured to report the security threat to the client.

6. The system of claim 1, wherein the computing cloud is configured to filter data that reaches the client.

7. The system of claim 6, wherein the filtering of data by the computing cloud comprises preventing spam and malware from reaching the client.

8. The system of claim 6, wherein the filtering of data by the computing cloud comprises preventing unauthorized access to the client.

9. The system of claim 4, wherein the list of known operational modes of the client includes a startup mode, a shutdown mode, a maintenance mode, a normal operation mode, and an installation mode.

10. The system of claim 4, wherein the one or more characteristics regarding the anticipated traffic pattern associated with each operational mode include the amount of network bandwidth used, the number of destination Internet Protocol addresses used, and a list of the ports over which data may be transmitted.

11. The system of claim 10, wherein, to form the comparison, the computing cloud is further configured to:
 determine whether the amount of network bandwidth used at the client is within a threshold amount for the anticipated traffic pattern associated with the operational mode; and
 determine whether a port over which the traffic associated with the client is being transmitted is expected for the operational mode of the client.

12. A method comprising:
 defining a plurality of operational modes, wherein each operational mode is associated with at least one anticipated traffic pattern of a client;
 storing the plurality of operational modes;
 monitoring traffic of the client;
 determining the operational mode of the client;
 generating a value for a condition of the monitored traffic; and
 comparing the generated value for the condition of the monitored traffic of the client with a value for the anticipated traffic pattern associated with the operational mode of the client to form a comparison;
 wherein generating the value for the condition of the monitored traffic of the client comprises:
  generating the value for the condition of the monitored traffic based on a number of factors including a number of destination Internet Protocol addresses for the traffic associated with the client, an amount of network bandwidth used at the client, and ports over which the traffic associated with the client is being transmitted.

13. The method of claim 12, further comprising:
 preventing a computer intrusion by filtering data traffic based on the comparison.

14. The method of claim 12, further comprising:
 identifying a computer intrusion based upon detecting that the anticipated traffic pattern is not the same as the monitored traffic.

15. The method of claim 12, wherein the method is performed by a computing cloud.

16. The method of claim 12, wherein the client controls at least one industrial automation tool.

17. The method of claim 12, wherein monitoring the traffic of the client comprises monitoring at least two traffic types.

18. The method of claim 17, wherein the traffic types comprise a file transfer protocol traffic type and an email traffic type.

19. A system comprising:
 a computing cloud comprising at least one processing unit and at least one data storage unit; and
 a client configured to be connected to a network through the computing cloud;
 wherein the computing cloud is configured to determine an operational mode of the client, monitor network traffic of the client, generate a value for a condition of the monitored traffic, compare the generated value for the condition of the monitored traffic with a value for an anticipated traffic pattern associated with the operational mode to form a comparison, determine if a security threat is indicated based on the comparison, and maintain security of the client based on the operational mode;
 wherein, to generate the value for the condition of the monitored traffic, the computing cloud is configured to generate the value for the condition of the monitored traffic based on a number of factors including a number of destination Internet Protocol addresses for the traffic associated with the client, an amount of network bandwidth used at the client, and ports over which the traffic associated with the client is being transmitted.

20. The system of claim 19, wherein the computing cloud is further configured to control high level operations of the client.

21. The system of claim 19, wherein the computing cloud is configured to filter the network traffic of the client.

22. The system of claim 19, wherein, upon the computing cloud determining that a network intrusion has occurred, the computing cloud is configured to filter network traffic from an intruder.

* * * * *